United States Patent
Zhang

(10) Patent No.: US 11,535,238 B2
(45) Date of Patent: Dec. 27, 2022

(54) EXHAUST HEATING SYSTEM TO REDUCE ENGINE COLD START EMISSIONS

(71) Applicant: FORD GLOBAL TECHNOLOGIES, LLC, Dearborn, MI (US)

(72) Inventor: Xiaogang Zhang, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/228,094

(22) Filed: Apr. 12, 2021

(65) Prior Publication Data
US 2022/0324432 A1    Oct. 13, 2022

(51) Int. Cl.
| | |
|---|---|
| B60W 20/16 | (2016.01) |
| F01N 3/20 | (2006.01) |
| F02D 41/02 | (2006.01) |
| F01N 3/30 | (2006.01) |
| B60W 10/02 | (2006.01) |
| B60W 10/06 | (2006.01) |
| B60W 40/08 | (2012.01) |
| B60W 10/08 | (2006.01) |

(52) U.S. Cl.
CPC ............ *B60W 20/16* (2016.01); *B60W 10/02* (2013.01); *B60W 10/06* (2013.01); *B60W 10/08* (2013.01); *B60W 40/08* (2013.01); *F01N 3/2013* (2013.01); *F01N 3/30* (2013.01); *F02D 41/024* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,562,695 A | * | 1/1986 | Rao | F01N 3/032 60/303 |
| 4,875,336 A | * | 10/1989 | Hayashi | F01N 3/032 60/288 |
| 5,458,673 A | * | 10/1995 | Kojima | F01N 9/002 55/288 |
| 5,489,319 A | * | 2/1996 | Tokuda | F01N 13/011 96/400 |
| 8,424,287 B2 | * | 4/2013 | Atluri | F01N 9/00 180/2.2 |
| 8,828,342 B1 | * | 9/2014 | Tyo | B01D 53/9495 60/287 |
| 10,830,116 B2 | * | 11/2020 | Laube | F01N 3/20 |
| 2003/0233825 A1 | * | 12/2003 | Asanuma | F01N 3/2013 60/299 |
| 2009/0175772 A1 | * | 7/2009 | Hansen | B01D 53/9454 423/213.2 |
| 2011/0000194 A1 | | 1/2011 | Gonze et al. | |
| 2020/0102874 A1 | | 4/2020 | Kurtz et al. | |
| 2020/0408124 A1 | | 12/2020 | McCarrick et al. | |

\* cited by examiner

*Primary Examiner* — Binh Q Tran
(74) *Attorney, Agent, or Firm* — Vincent Mastrogiacomo; Brooks Kushman P.C.

(57) ABSTRACT

An aftertreatment device of a vehicle exhaust system includes an aftertreatment device. The aftertreatment device includes a body defining an inlet cone, an outlet cone, and a cavity therebetween. A heating element is disposed in the cavity. A catalyst is disposed in the cavity downstream of the heating element. A recirculation loop has a conduit with a first end connected to the outlet cone and a second end connected to the inlet cone. The recirculation loop further has an air-circulation device configured to recirculate heated air from the outlet cone to the inlet cone.

20 Claims, 3 Drawing Sheets

EXHAUST HEATING SYSTEM TO REDUCE ENGINE COLD START EMISSIONS

TECHNICAL FIELD

This disclosure relates to engine cold start and more particularly to heating a catalyst of an exhaust system to reduce engine cold start emissions.

BACKGROUND

Vehicles may include an engine having an exhaust system. The exhaust system may include an aftertreatment device containing a catalyst. This is sometimes referred to as a catalytic converter. The catalytic converter includes a catalyst configured to convert raw exhaust gases into desired reaction products.

SUMMARY

According to one embodiment, an aftertreatment device of a vehicle exhaust system includes an aftertreatment device. The aftertreatment device includes a body defining an inlet cone, an outlet cone, and a cavity therebetween. A heating element is disposed in the cavity. A catalyst is disposed in the cavity downstream of the heating element. A recirculation loop has a conduit with a first end connected to the outlet cone and a second end connected to the inlet cone. The recirculation loop further has an air-circulation device configured to recirculate heated air from the outlet cone to the inlet cone.

According to another embodiment, an engine exhaust system includes an aftertreatment device having a heating element and a catalyst disposed downstream of the heating element. A recirculation loop associated with the aftertreatment device has an air-circulation device and conduit configured to circulate air from downstream of the catalyst to upstream of the heating element. A controller is programmed to, in response to a request to start an engine and a temperature of the catalyst being less than a threshold, inhibit starting of the engine and energize the heating element and the air-circulation device to heat the catalyst with the heating element while the engine is OFF.

According to yet another embodiment, a method of heating an aftertreatment device of a hybrid vehicle includes inhibiting starting of an engine when a catalyst of an aftertreatment device is less than a threshold temperature; heating the catalyst while the engine is OFF by activating a heating element disposed within the aftertreatment device and by activating an air-circulation device that is configured to circulate air from an outlet cone of the aftertreatment device to an inlet cone of the aftertreatment device; and starting the engine when the catalyst exceeds the threshold temperature.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
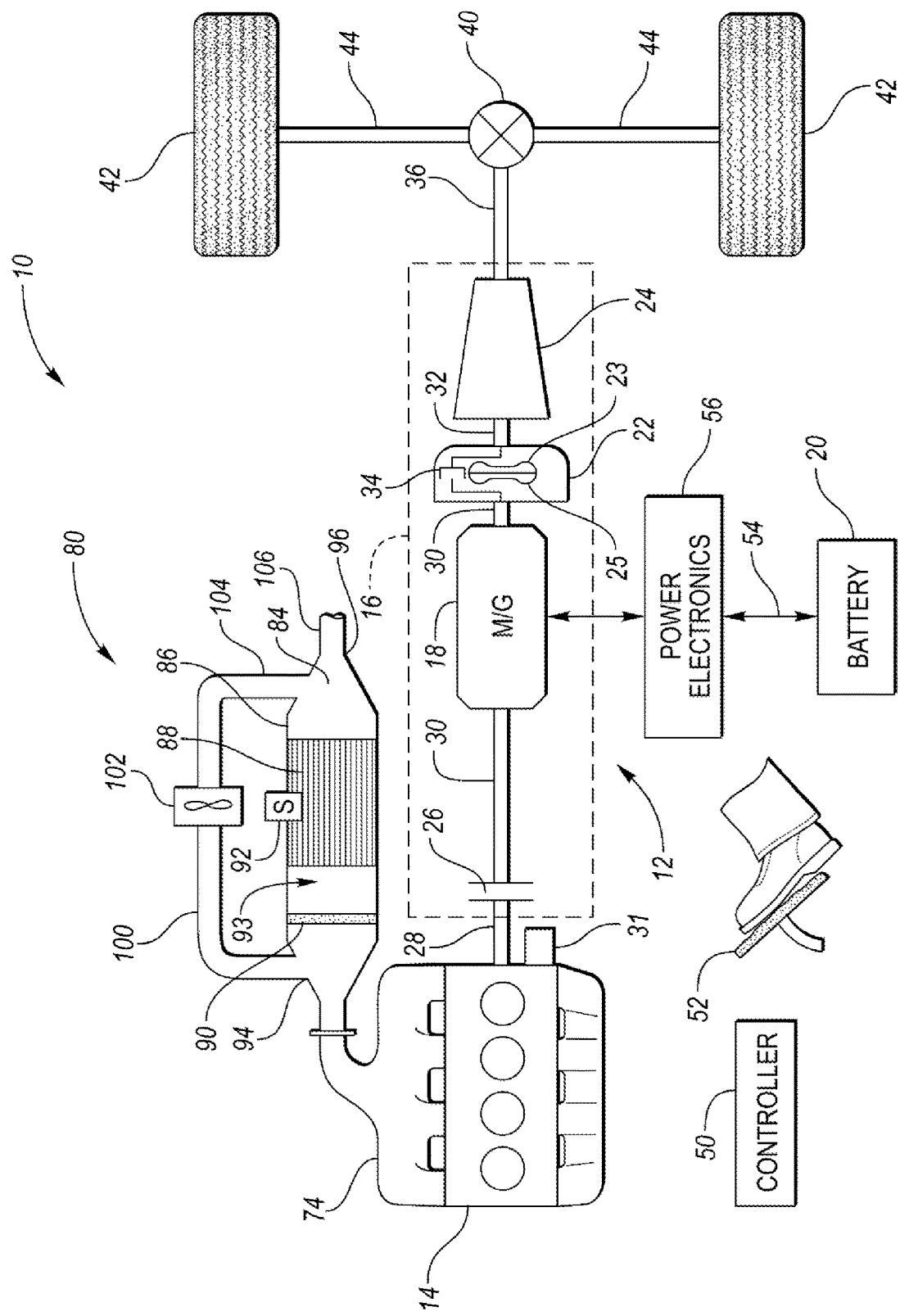
FIG. 1 is a schematic diagram of a hybrid electric vehicle according to one or more embodiments.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular hybrid transmission (MHT). As will be described in further detail below, the transmission 16 includes an electric machine such as an electric motor/generator (M/G) 18, an associated traction battery 20, a torque converter 22, and a multiple step-ratio automatic transmission or gearbox 24. The engine 14, M/G 18, torque converter 22, and the automatic transmission 16 are connected sequentially in series, as illustrated in FIG. 1. For simplicity, the M/G 18 may be referred to as a motor.

The engine 14 and the M/G 18 are both drive sources for the HEV 10 and may be referred to as actuators. The engine 14 generally represents a power source that may include an internal-combustion engine such as a gasoline or diesel engine. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics condition direct current (DC) power provided by the battery 20 to the requirements of the M/G 18, as will be described below. For example, power electronics may provide three-phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously, drivably connected to the shaft 30, whereas the engine 14 is drivably connected to the shaft 30 only when the disconnect clutch 26 is at least partially engaged. When the disconnect clutch 26 is locked (fully engaged), the crankshaft 28 is fixed to the shaft 30.

A separate starter motor 31 can be selectively engaged with the engine 14 to rotate the engine to allow combustion to begin. Once the engine is started, the starter motor 31 can be disengaged from the engine via, for example, a clutch (not shown) between the starter motor 31 and the engine 14. In one embodiment, the starter motor 31 is a belt-integrated starter generator (BISG). In one embodiment, the engine 14 is started by the starter motor 31 while the disconnect clutch 26 is open, keeping the engine disconnected with the M/G 18. Once the engine has started and is brought up to speed with the M/G 18, the disconnect clutch 26 can couple the engine 14 to the M/G 18 to allow the engine to provide drive torque.

In another embodiment, the starter motor 31 is not provided and, instead, the engine 14 is started by the M/G 18. To do so, the disconnect clutch 26 partially engages to transfer torque from the M/G 18 to the engine 14. The M/G 18 may be required to ramp up in torque to fulfill driver demands while also starting the engine 14. The disconnect clutch 26 can then be fully engaged once the engine speed is brought up to the speed of the M/G.

The M/G 18 is connected to the torque converter 22 via shaft 30. The torque converter 22 is therefore connected to the engine 14 when the disconnect clutch 26 is at least partially engaged. The torque converter 22 includes an impeller 23 fixed to M/G shaft 30 and a turbine 23 fixed to a transmission input shaft 32. The torque converter 22 provides a hydraulic coupling between shaft 30 and transmission input shaft 32. The torque converter 22 transmits power from the impeller 23 to the turbine 25 when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and the launch clutch 34 (which may be a torque converter bypass clutch) is generally referred to as a downstream clutch.

The gearbox 24 may include gear sets, such as planetary gear sets, that are selectively placed in different gear ratios by selective engagement of friction elements such as clutches and brakes to establish the desired multiple discrete or step drive ratios. For simplicity, the gear ratios may be referred to as gears, i.e., first gear, second gear, etc. The friction elements are controllable through a shift schedule that connects and disconnects certain elements of the gear sets to control the speed and torque ratios between a transmission output shaft 36 and the transmission input shaft 32. The gearbox 24 may have six speeds including first through sixth gears. In this example, sixth gear may be referred to as top gear. First gear has the lowest speed ratio and the highest torque ratio between the input shaft 32 and the output shaft 36, and top gear has the highest speed ratio and the lowest torque ratio. The gearbox 24 is automatically shifted from one ratio to another based on various vehicle and ambient operating conditions by an associated controller, such as a powertrain control unit (PCU). The gearbox 24 then provides powertrain-output torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes one or more controllers 50 such as a powertrain control unit (PCU), an engine control module (ECM), and a motor control unit (MCU). While illustrated as one controller, the controller 50 may be part of a larger control system and may be controlled by various other controllers throughout the vehicle 10, such as a vehicle system controller (VSC). It should therefore be understood that the controller 50 and one or more other controllers can collectively be referred to as a "controller" that controls various actuators in response to signals from various sensors to control functions such as starting/stopping, operating M/G 18 to provide wheel torque or charge battery 20, select or schedule transmission shifts, etc. Controller 50 may include a microprocessor or central processing unit (CPU) in communication with various types of computer-readable storage devices or media. Computer-readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the vehicle.

The controller communicates with various vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals to and/or from engine 14, disconnect clutch 26, M/G 18, launch clutch 34, transmission gearbox 24, power electronics 56, and an exhaust air-circulation system 100. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic executed by the controller include fuel-injection timing, rate, and duration, throttle-valve position, spark plug ignition timing (for spark-ignition engines), intake/exhaust valve timing and duration, front-end accessory drive (FEAD) components such as an alternator, air conditioning compressor, battery charging, regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake-manifold pressure (MAP), accelerator-pedal position (PPS), ignition-switch position (IGN), throttle-valve position (TP), air temperature (TMP), exhaust gas oxygen (EGO) or other exhaust gas component concentration or presence, intake-air flow (MAF), transmission gear, ratio, or mode, transmission-oil temperature (TOT), transmission-turbine speed (TS), torque converter bypass clutch 34 status (TCC), deceleration or shift mode (MDE), for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to request a demanded torque, power, or drive command to propel the vehicle. In general, depressing and releasing the pedal 52 generates an accelerator pedal position signal that may be interpreted by the controller 50 as a demand for increased power or decreased power, respectively. This may be referred to as driver-demanded torque. Based at least upon input from the pedal, the controller 50 commands torque from the engine 14 and/or the M/G 18. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. When the engine 14 alone provides the torque necessary to propel the vehicle, this operation mode may be referred to as the "engine mode," "engine-only mode," or "mechanical mode."

The M/G 18 may assist the engine 14 by providing additional power to turn the shaft 30. This operation mode may be referred to as a "hybrid mode," an "engine-motor mode," or an "electric-assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The controller 50 commands the power electronics 56 to convert voltage from the battery 20 to an AC voltage provided to the M/G 18 to provide positive torque (drive torque) or negative torque (regenerative braking) to the shaft 30. This operation mode may be referred to as an "electric only mode," "EV (electric vehicle) mode," or "motor mode."

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which rotational energy from spinning wheels 42 is transferred back through the gearbox 24 and is converted into electrical energy for storage in the battery 20. The M/G 18 may be referred to as providing negative torque when acting as a generator.

It should be understood that the schematic illustrated in FIG. 1 is merely exemplary and is not intended to be limiting. Other configurations are contemplated that utilize selective engagement of both an engine and a motor to transmit through the transmission. For example, the M/G 18 may be offset from the crankshaft 28, and/or the M/G 18 may be provided between the torque converter 22 and the gearbox 24. Other configurations are contemplated without deviating from the scope of the present disclosure.

Figure 2:
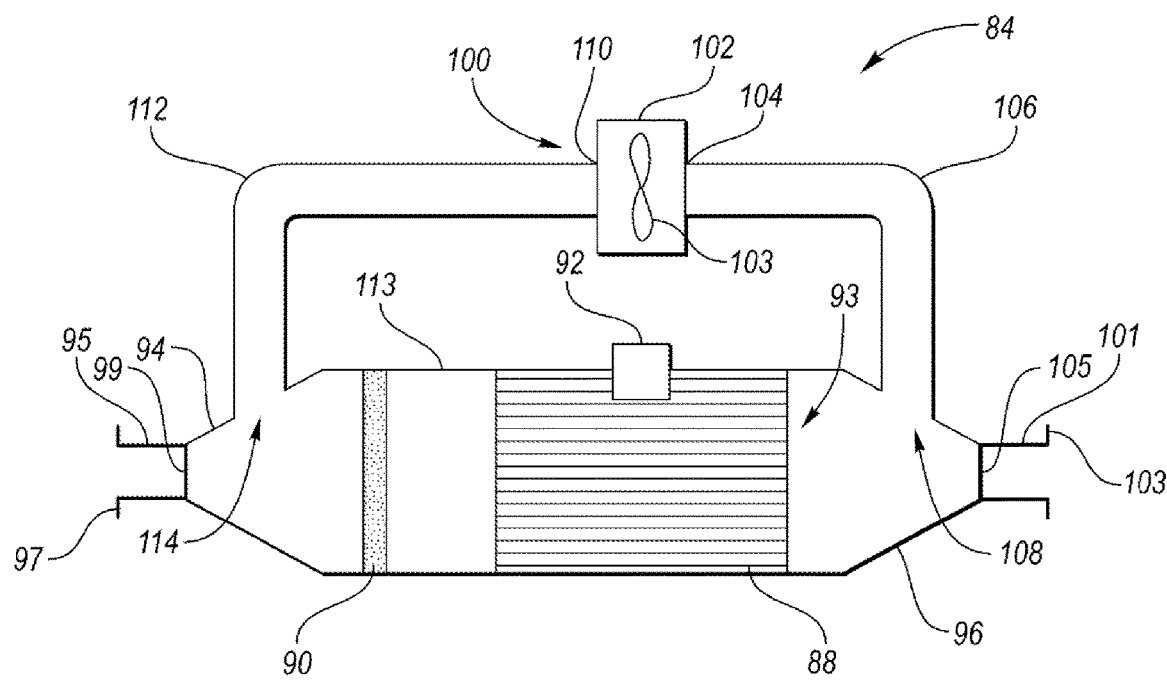
FIG. 2 is a schematic diagram of an after-treatment device of a vehicle exhaust system.

Referring to FIGS. 1 and 2, the vehicle 10 includes an exhaust system 80 connected to an exhaust manifold 74. The exhaust system 80 includes an aftertreatment device 84. The aftertreatment device 84 may be a catalytic converter or a device that otherwise includes a catalyst. The aftertreatment device 84 includes a housing or body 86 that may contain a catalyst 88, a heating element 90, and/or a temperature sensor 92. The temperature sensor 92 is optional, and the temperature of the catalyst may be inferred as known in the art.

The body 86 may have a cylindrical shape and may be centered in line with the exhaust pipes. The body 86 defines a cavity 93, an inlet cone 94 connected to the exhaust manifold 74 and an outlet cone 96 that is connected to the muffler (not shown) by one or more exhaust pipes 106. (Used herein, "connected" refers to directly connected or indirectly connected through intermediaries unless otherwise indicated explicitly or by context.) The inlet cone 94 may include an associated conduit 95 having a flange 97 configured to connect with the exhaust manifold 74 or an exhaust pipe. The inlet cone 94 defines an opening 99 in fluid communication with the conduit 95 to receive exhaust gases. The opening 99 may be concentric with a centerline of the aftertreatment device 84. The conduit 95 may be welded or otherwise connected to the opening 99 of the inlet cone 94. Alternatively, the conduit 95 may be integral with the body 86. The outlet cone 96 may also include an associated conduit 101 having a flange 103 configured to connect with a downstream exhaust pipe. The outlet cone 96 defines an opening 105 in fluid communication with the conduit 101 to exit the exhaust gases. The conduit 101 may be welded or otherwise attached to the outlet cone 96. Alternatively, the conduit 101 may be integral with the body 86.

The heating element 90 may be an electric heating element powered by the traction battery 20 or and auxiliary battery (not shown) and controlled by the controller 50. Example heating elements include an electric coil or similar resistance element that converts electrical energy into heat through the process of Joule heating. The heating element 90 may be disposed upstream of the catalyst 88, i.e., between the inlet cone 94 and the catalyst 88. The heating element 94 may be capable of generating very hot temperatures, such as up to 1200 degrees Celsius, so that the air may be heated in excess of 700 degrees Celsius. The temperature sensor 92 may be disposed in a location that measures the temperature of the catalyst 88. The temperature sensor 92 may be in electric communication with the controller 50 and is configured to output data to the controller indicative of a measured temperature.

The catalyst may be a two-way converter that combines oxygen with carbon monoxide and unburned hydrocarbons to produce carbon dioxide and water, or a three-way converter that also reduce oxides of nitrogen. The catalyst 88 may include a ceramic carrier matrix having a plurality of channels. A highly porous ceramic coating, sometimes referred to as a washcoat, is applied to the surface of the channels to increase the surface area. Chemical catalysts, such as precious metals platinum, palladium, and/or rhodium, are embedded in the washcoat.

The catalyst 88 is highly efficient at converting the raw exhaust gases into the desired reaction products once operating temperatures are reached. Below this temperature, and more specifically below the light-off temperature, e.g., 300 degree Celsius, the chemical reactions do not take place or are incomplete. Thus, it is advantageous to heat the catalyst quickly. It is also advantageous to quickly heat the engine to its operating temperature. Cold engines have reduced efficiency due to increased friction, fuel film on cold cylinder walls and pistons, and reduced evaporation. The emissions produced during cold start of the engine may account for as much as one third of total emissions during a drive cycle. As such, reducing the warm-up time of the engine 14 and the aftertreatment device 86 is effective for reducing emissions.

To reduce the warm-up times of the catalyst 88, the aftertreatment device 84 includes the heater 90 and an associated recirculation loop 100 configured to circulate hot air across the heater 90 and the catalyst 88 when the engine is OFF. The recirculation loop 100 may be packaged as part of the aftertreatment device 84 or as a separate component that attaches to the exhaust system 80. In the illustrated embodiment, the recirculation loop 100 is packaged as part of the aftertreatment device assembly. The recirculation loop 100 is configured to circulate air downstream of the catalyst 88 to upstream of the heating element 90. For example, the recirculation loop 100 circulates air from the outlet cone 96 to the inlet cone 94.

The recirculation loop 100 includes an air-circulation device 102. The air-circulation device 102 may be any device configured to circulate air. Examples include a fan, a blower, an air pump, and the like. The air-circulation device 102 may include an associated electric motor that is powered by the traction battery 20 or by the auxiliary battery. The motor powers rotatable fan blades 103, vanes, or the like to circulate air. The energization state and operating parameters, e.g., speed, of the air-circulation device 102 may be controlled by the controller 50 as will be described in more detail below. The air-circulation device 102 includes a suction side 104 that is connected in fluid communication with the outlet cone 96 by conduit 106. For example, the conduit 106 includes a first end connected to the suction side 104 of the air-circulation device 102 and a second end that is connected to an opening 108 defined in the sidewall of the outlet cone 96. A high-pressure side 110 of the air-circulation device 102 is connected in fluid communication with the inlet cone 94. For example, a conduit 112 includes a first end connected to the high-pressure side 110 of the air-circulation device 102 and a second end connected to an opening 114 defined in the sidewall of the inlet cone 94. Alternatively, the conduit 106 and 112 may also be attached to the cylindrical sidewall 113 of the body 86 at points downstream of the catalyst 88 and upstream of the heating element 90, respectively, rather than attaching at the cones.

During a warm-up routine, the catalyst 88 is heated by circulating air across the energized heating element 90 and then flowing the heated air through the catalyst 88. The recirculation loop 100 then draws heated air from the outlet cone 96 and circulates it to the inlet cone 94 to repeat the loop. The engine 14 may be OFF during this warm-up routine. In the case of a hybrid, the traction motor, e.g., M/G 18, can be used to propel the vehicle during the warm-up routine. That is, the vehicle may be in the electric only mode as described above.

Figure 3:
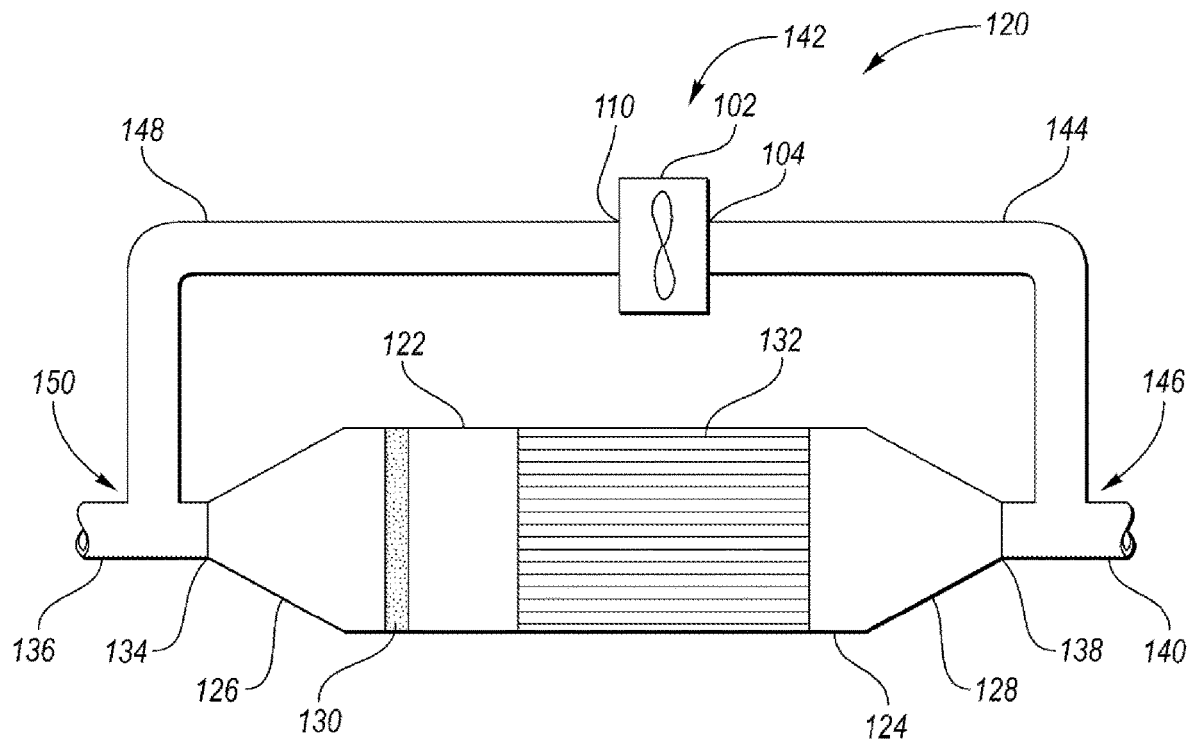
FIG. 3 is a schematic diagram of another after-treatment device of a vehicle exhaust system.

FIG. 3 shows an alternative embodiment in which the aftertreatment device and the recirculation loop are packaged separately. The exhaust system 120 may include an aftertreatment device 122 that is similar to the above-described aftertreatment device 84. Briefly, the aftertreatment device 122 may include a body 124 defining and inlet cone 126 and an outlet cone 128. A heating element 130 and a catalyst 132 are disposed within the body 124 as described above. An inlet 134 of the inlet cone 126 is connected to an exhaust pipe 136, and an outlet 138 of the outlet cone 128 is connected to an exhaust pipe 140. The recirculation loop 142 may extend between the exhaust pipes 136 and 140 rather than being connected to the cones of the aftertreatment device. For example, a conduit 144 of the recirculation loop 142 may be connected to the exhaust pipe 140 by a tee-fitting 146, and a conduit 148 may be connected to the exhaust pipe 136 by a tee-fitting 150.

Figure 4:
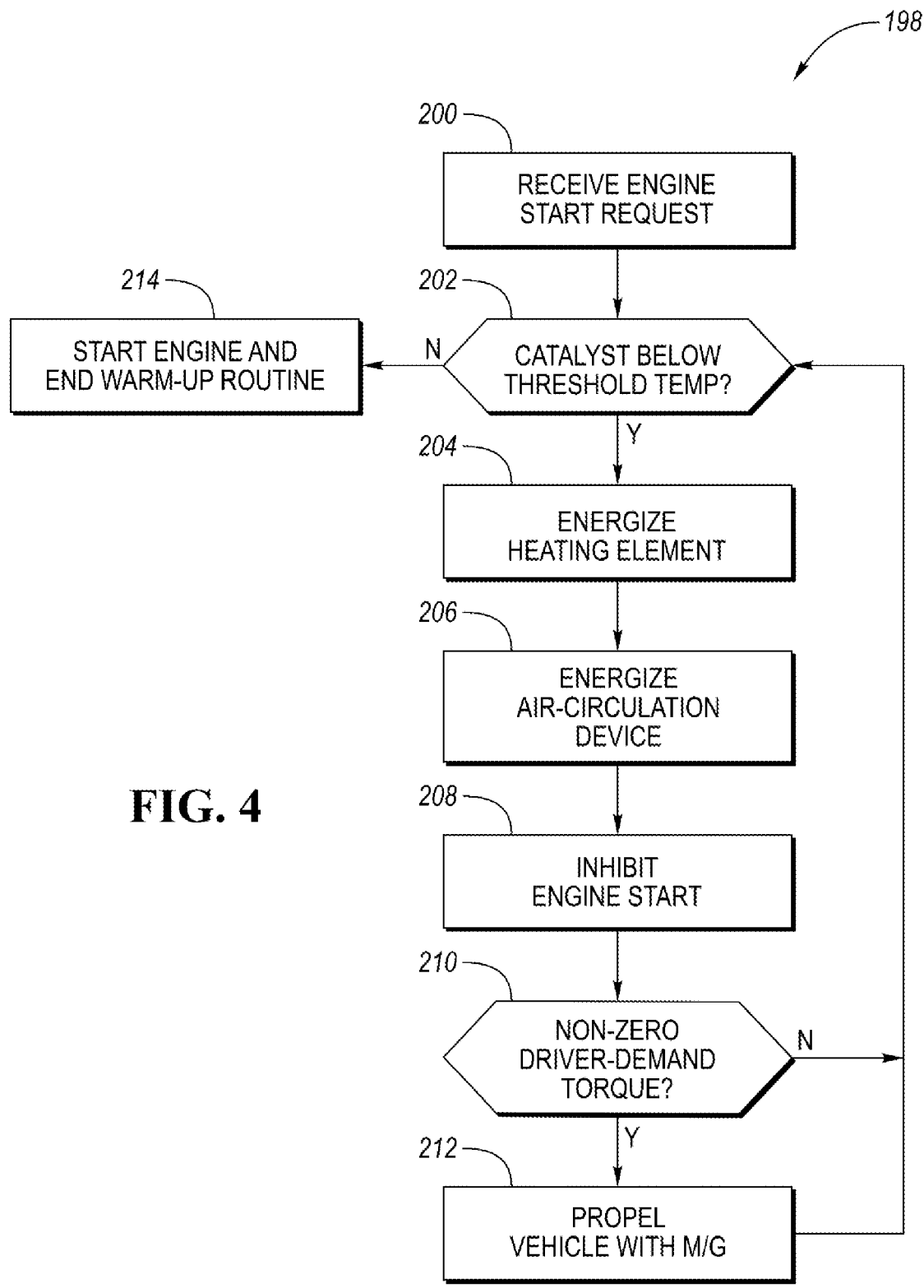
FIG. 4 is a flow chart of an example algorithm for operating the vehicle during an engine cold start.

FIG. 4 illustrates a flowchart 198 of an example algorithm for performing a warm-up routine during cold starting of the engine. The warm-up routine heats the catalyst prior to starting of the engine in order to reduce vehicle emissions. Controls 198 may begin at operation 200 with a request to start the engine. Alternatively, the warm-up routine may be initiated at key-on or during a preconditioning mode in which the vehicle is prepared for departure. As discussed above, the engine may be requested to start for a variety of reasons such as low battery state of charge, high driver-demanded torque, and others. At operation 202, the controller determines if the catalyst is below a threshold temperature. The catalyst temperature may be determined based on data provided by the temperature sensor 92 or inferred through other measurements and models. The threshold temperature may be the light-off temperature of the catalyst or may be a higher or lower temperature. An example threshold temperature may be between 200 degrees and 350 degrees Celsius depending upon the catalyst used. If the catalyst temperature is above the threshold, the engine may be started at operation 214 and the warm-up routine ends.

Control passes to operation 204 if the catalyst is below the threshold temperature. In response to the catalyst being less than the threshold temperature at operation 202, the controller energizes the heating element at operation 204 and energizes the air-circulation device at operation 206.

The engine is inhibited from starting during the warm-up routine as shown at operation 208. In then illustrated configuration of FIG. 1, the engine may be disconnected from the M/G 18 by opening the disconnect clutch. This allows the vehicle to be propelled in electric-only mode without rotating the crankshaft of the engine. At operation 210, the controller determines if a non-zero driver-demanded torque is being requested, i.e., is the accelerator pedal actuated or is the vehicle demanding wheel torque? If no, the vehicle remains parked and control loops back to operation 202 to determine if the catalyst has been heated to the threshold temperature. If yes, the engine is then started and the warm-up routine ends, i.e., the heating element and the air-circulation system may be de-energized, at operation 214.

If a non-zero driver-demanded torque is present during the warm-up routine, control passes to operation 212 and an electric-only mode request is issued. The request may be sent to other control logic associated with propelling the vehicle. That is, the vehicle is only propelled with the M/G to allow the warm-up routine to continue. While not illustrated, the vehicle control logic may exit the warm-up mode and start the engine regardless of catalyst temperature if it is necessary for the engine to start, e.g., low battery state of charge, insufficient electric only torque, or the like. Otherwise, the air-circulation system will circulate heated air through the engine and the exhaust system until the catalyst temperature reaches the threshold.

While various aspects of this invention have been described in conjunction with the hybrid vehicle of FIG. 1 as the representative embodiment, this invention is not limited thereto. In other embodiments, the vehicle may have a power-split hybrid architecture, such as that described in Applicants U.S. Pat. No. 9,919,608 issued Mar. 20, 2018, the contents of which are incorporated by reference herein. Alternatively, the vehicle may have a conventional powertrain that relies solely on an internal-combustion engine for power.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An aftertreatment device of a vehicle exhaust system, the aftertreatment device comprising:
    a body defining an inlet cone, an outlet cone, and a cavity therebetween;
    a heating element disposed in the cavity;
    a catalyst disposed in the cavity downstream of the heating element;
    a recirculation loop including conduit having a first end connected to the outlet cone and a second end connected to the inlet cone and including an air-circulation device configured to recirculate heated air from the outlet cone to the inlet cone; and
    a controller programmed to, in response to a request to start an engine and a temperature of the catalyst being less than a threshold, inhibit starting of the engine and energize the heating element to heat the catalyst with the heating element while the engine is OFF.

2. The aftertreatment device of claim 1, wherein the outlet cone defines a first opening configured to connect with an exhaust pipe and a second opening connected to the first end, wherein the inlet cone defines a first opening configured to receive exhaust gases from an exhaust manifold and a second opening connected to the second end.

3. The aftertreatment device of claim 1, wherein the controller is further programmed, in response to the request to start the engine and the temperature of the catalyst being less than the threshold, energize the air-circulation device.

4. The aftertreatment device of claim 1, wherein the heating element is an electric heating element.

5. The aftertreatment device of claim 1, wherein the air-circulation device is an electric fan.

6. The aftertreatment device of claim 1 further comprising a temperature sensor disposed in the body and configured to output data indicative of a measured temperature of the catalyst.

7. An engine exhaust system comprising:
    an aftertreatment device including a heating element and a catalyst disposed downstream of the heating element;
    a recirculation loop associated with the aftertreatment device and including an air-circulation device and conduit configured to circulate air from downstream of the catalyst to upstream of the heating element; and
    a controller programmed to, in response to a request to start an engine and a temperature of the catalyst being less than a threshold, inhibit starting of the engine and energize the heating element and the air-circulation device to heat the catalyst with the heating element while the engine is OFF.

8. The engine exhaust system of claim 7, wherein the controller is further programmed to, in response to the temperature of the catalyst exceeding the threshold, de-energize the heating element and the air-circulation device.

9. The engine exhaust system of claim 7 further comprising a temperature sensor attached to the aftertreatment device and configured to output data indicative of the temperature of the catalyst, wherein the controller is further programmed to receive the data indicative of the temperature of the catalyst.

10. The engine exhaust system of claim 9, wherein the temperature sensor is disposed within the catalyst.

11. The engine exhaust system of claim 7, wherein the threshold is based on a light-off temperature of the catalyst.

12. The engine exhaust system of claim 11, wherein the threshold is a light-off temperature of the catalyst.

13. The engine exhaust system of claim 7, wherein the aftertreatment device defines an inlet cone and outlet cone, and wherein the recirculation loop is connected between the inlet and outlet cones.

14. The engine exhaust system of claim 7, wherein the heating element is an electric heating element.

15. The engine exhaust system of claim 7, wherein the air-circulation device is an electric fan.

16. A method of heating an aftertreatment device of a hybrid vehicle, the method comprising:
inhibiting starting of an engine when a catalyst of an aftertreatment device is less than a threshold temperature;
heating the catalyst while the engine is OFF by activating a heating element disposed within the aftertreatment device and by activating an air-circulation device that is configured to circulate air from an outlet cone of the aftertreatment device to an inlet cone of the aftertreatment device; and
starting the engine when the catalyst exceeds the threshold temperature.

17. The method of claim 16 further comprising de-energizing the heating element and the air-circulation device when the catalyst exceeds the threshold temperature.

18. The method of claim 16 further comprising commanding driver-demanded torque to a traction motor when the engine is inhibited from starting and the catalyst is less than the threshold temperature.

19. The method of claim 16 further comprising disengaging an engine disconnect clutch when the catalyst is less than the threshold temperature.

20. The method 16 further comprising receiving temperature data indicative of a measured temperature of the catalyst from a temperature sensor.

* * * * *